US008879542B2

(12) United States Patent
Samarasinghe et al.

(10) Patent No.: US 8,879,542 B2
(45) Date of Patent: *Nov. 4, 2014

(54) METHOD FOR PROVIDING LOCAL AND TOLL SERVICES WITH LNP, AND TOLL-FREE SERVICES TO A CALLING PARTY WHICH ORIGINATES THE CALL FROM AN IP LOCATION CONNECTED TO A SIP-ENABLED IP NETWORK

(75) Inventors: Harish Samarasinghe, Holmdel, NJ (US); Robert Yaeger Peters, Jr., Rumson, NJ (US)

(73) Assignee: At&T Intellectual Property II, L.P., Atlanta, GA (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/619,354

(22) Filed: Sep. 14, 2012

(65) Prior Publication Data
US 2013/0010652 A1    Jan. 10, 2013

Related U.S. Application Data

(63) Continuation of application No. 12/099,119, filed on Apr. 7, 2008, now Pat. No. 8,306,019, which is a continuation of application No. 10/765,597, filed on Jan. 27, 2004, now Pat. No. 7,366,163.

(60) Provisional application No. 60/465,680, filed on Apr. 25, 2003.

(51) Int. Cl.
*H04L 12/28*    (2006.01)
*H04M 7/12*    (2006.01)

(52) U.S. Cl.
CPC ............ *H04M 7/123* (2013.01); *H04M 7/1275* (2013.01)

USPC .......................................... 370/352; 370/401

(58) Field of Classification Search
CPC ....................................................... H04M 7/126
USPC ................... 370/352, 401, 410, 522
See application file for complete search history.

(56) References Cited

U.S. PATENT DOCUMENTS

| 5,771,282 A | 6/1998 | Friedes |
| 5,790,176 A | 8/1998 | Craig |
| 5,864,563 A | 1/1999 | Ratcliffe |
| 5,864,850 A | 1/1999 | Nordman |

(Continued)

FOREIGN PATENT DOCUMENTS

| EP | 0 866 626 | 2/1998 |
| EP | 1 179 927 | 2/2002 |

(Continued)

*Primary Examiner* — Creighton Smith

(57) ABSTRACT

A method for providing combined local, toll, toll-free services, and number portability, to a calling party originating calls from an IP-based communication devices which are coupled to an IP-based multi-media service provider. The method includes receiving a SIP INVITE message, which includes a multi-media service identifier, at the multi-media provider. The SIP INVITE message represents a call request for a multi-media service. The SIP INVITE message is processed at the multi-media service provider for determining if the call request can be satisfied. If the multi-media service provider includes resources for satisfying the call, the multi-media service identifier of the SIP INVITE message is set to a first predetermined state and the call is processed. If the multi-media service provider does not include resources for satisfying the call, the multi-media service identifier of the SIP INVITE message is set to a second predetermined state and the call is processed elsewhere.

20 Claims, 3 Drawing Sheets

(56) References Cited

U.S. PATENT DOCUMENTS

| | | |
|---|---|---|
| 5,867,494 A | 2/1999 | Krishnaswamy et al. |
| 5,898,769 A | 4/1999 | Furman |
| 5,915,013 A | 6/1999 | Mintz et al. |
| 5,923,742 A | 7/1999 | Kodialam et al. |
| 5,926,649 A | 7/1999 | Ma et al. |
| 5,983,217 A | 11/1999 | Khosravi-Sichani et al. |
| 6,038,230 A | 3/2000 | Ofek |
| 6,101,494 A | 8/2000 | Khosravi-Sichani et al. |
| 6,148,071 A | 11/2000 | Friedes et al. |
| 6,161,134 A | 12/2000 | Wang et al. |
| 6,178,400 B1 | 1/2001 | Eslambolchi |
| 6,240,391 B1 | 5/2001 | Ball et al. |
| 6,259,691 B1 | 7/2001 | Naudus |
| 6,272,131 B1 | 8/2001 | Ofek |
| 6,272,132 B1 | 8/2001 | Ofek et al. |
| 6,330,236 B1 | 12/2001 | Ofek et al. |
| 6,356,294 B1 | 3/2002 | Martin et al. |
| 6,377,579 B1 | 4/2002 | Ofek |
| 6,377,674 B1 | 4/2002 | Chong et al. |
| 6,401,099 B1 | 6/2002 | Koppolu et al. |
| 6,404,746 B1 | 6/2002 | Cave et al. |
| 6,421,674 B1 | 7/2002 | Yoakum et al. |
| 6,434,143 B1 | 8/2002 | Donovan |
| 6,438,555 B1 | 8/2002 | Orton |
| 6,438,594 B1 | 8/2002 | Bowman-Amuah |
| 6,446,127 B1 | 9/2002 | Schuster et al. |
| 6,460,058 B2 | 10/2002 | Koppolu et al. |
| 6,477,150 B1 | 11/2002 | Maggenti et al. |
| 6,480,588 B1 | 11/2002 | Donovan |
| 6,483,600 B1 | 11/2002 | Schuster et al. |
| 8,306,019 B2 | 11/2012 | Samarasinghe |
| 2001/0020243 A1 | 9/2001 | Koppolu et al. |
| 2002/0082730 A1 | 6/2002 | Capps et al. |
| 2002/0103824 A1 | 8/2002 | Koppolu et al. |
| 2003/0012170 A1 | 1/2003 | Vassilovski et al. |
| 2003/0148779 A1 | 8/2003 | Aravamudan et al. |
| 2004/0081159 A1 | 4/2004 | Pan et al. |

FOREIGN PATENT DOCUMENTS

| | | |
|---|---|---|
| WO | WO-01/63877 | 8/2001 |
| WO | WO-01/63956 | 8/2001 |
| WO | WO-01/72007 | 9/2001 |
| WO | WO-01/76172 | 10/2001 |
| WO | WO-02/21859 | 3/2002 |
| WO | WO-02/45439 | 6/2002 |

METHOD FOR PROVIDING LOCAL AND TOLL SERVICES WITH LNP, AND TOLL-FREE SERVICES TO A CALLING PARTY WHICH ORIGINATES THE CALL FROM AN IP LOCATION CONNECTED TO A SIP-ENABLED IP NETWORK

CROSS REFERENCE TO RELATED APPLICATIONS

This application is a continuation of U.S. patent application Ser. No. 12/099,119, filed Apr. 7, 2008, which is currently allowed and is a continuation of U.S. patent application Ser. No. 10/765,597, filed Jan. 27, 2004, now U.S. Pat. No. 7,366,163; which claims priority to U.S. Provisional Application No. 60/465,680, filed Apr. 25, 2003, and all of the above cited applications are herein incorporated by reference in their entirety.

FIELD OF THE INVENTION

The present invention relates generally to a method for providing local and toll services over an IP network, and more specifically, to a method for providing local and toll services with Local Number Portability (LNP) and toll-free services to a calling party which originates the call from an IP location connected to a sip-enabled IP network.

BACKGROUND

Presently, transporting both standard and non-standard information in a common framework over Internet Protocol (IP) based networks is becoming an economically and technically effective means of providing communication services. There is a need, however, to provide local and toll services in circuit based telecommunication networks, which are associated with IP communication networks.

The process of migrating existing services and capabilities provided on the circuit based network to an IP based network yet remains to be addressed. The circuit network provides reliable and high capacity services today using standard protocols. Providing the same services on an IP based network requires protocols like Session Initiation Protocol (SIP) and/or Hyper Text Transfer Protocol (HTTP), which is the protocol for moving hypertext files across the Internet. The common network architecture as used in this context refers to a network comprised of network elements, such as a Call Control Element, Network Routing Engine, Service Broker, Application Server, Media Server, Border Element, and possibly other network elements.

It would, therefore, be desirable to provide circuit network services on an IP based network.

SUMMARY OF THE INVENTION

A method of forming a multi-media communication path between at least a first communication device and at least a second communication device is set forth in accordance with aspects of the present invention. The method includes receiving a first Session Initiation Protocol (SIP) INVITE message at a call control element of a multi-media provider, which represents a first call request for a first predetermined multi-media service. The first SIP INVITE message may be redirected to a service broker associated with the multi-media provider for processing the first SIP INVITE message for determining at least a first predetermined application server of a plurality of application servers associated with the multi-media provider, which includes first predetermined resources for processing the first SIP INVITE message. The service broker further generates and sends a first SIP Redirect message to the call control element in responsive to the first SIP INVITE message, which includes instructions to communicate the call request to the first predetermined application server.

The first SIP Redirect message is processed at the call control element for generating a second SIP INVITE message, which includes a multi-media service identifier. The second SIP INVITE message is received and processed at the first predetermined application server for determining if the first predetermined application server includes resources for satisfying the first call request. If the application server determines that it includes resources for satisfying the first call request, the application server sets the multi-media service identifier to a first predetermined state and processes the call. If the application server determines that it does not include resources for satisfying the first call request, the application server sets the multi-media service identifier to a second predetermined state. Further, the application server redirects the call to other elements located local and/or remote the multi-media provider for processing the call.

In another aspect of the present invention, the method of forming a multi-media communication path between at least a first communication device and at least a second communication device includes receiving a first Session Initiation Protocol (SIP) INVITE message at a call control element of a first carrier representing a first call request for a first predetermined multi-media service. The first SIP INVITE message may be redirected to a service broker associated with the first carrier for processing the first SIP INVITE message for determining an address of a remote application server associated with an industry toll-free database.

The service broker further generates a first SIP Redirect message, which includes the address of the remote application server associated with the industry toll-free database. The first SIP Redirect message is received and processed at the call control element to generate a second SIP INVITE message and including the address of the remote application server. The second SIP INVITE message is received and processed at the remote application server for determining an identifier associated with at least one carrier, which includes resources for satisfying the first call request. For example, the carrier may include at least one of systems and services provided by AT&T, MCI and Sprint.

In another aspect of the present invention, the method of forming a multi-media communication path between at least a first communication device and at least a second communication device includes receiving a first Session Initiation Protocol (SIP) INVITE message at a call control element of a first carrier representing a first call request for a first predetermined multi-media service. Based on the dialed number, the first SIP INVITE message may be redirected to an industry toll-free database via a signaling gateway.

In another aspect of the present invention, the method of forming a multi-media communication path between at least a first communication device and at least a second communication device includes receiving a first Session Initiation Protocol (SIP) INVITE message at a call control element of a first carrier representing a first call request for a first predetermined multi-media service. The first SIP INVITE message may be redirected to a service broker associated with an application server for determining the jurisdiction of the call as local or toll.

The above aspects of the present invention also provide methods for determining whether or not the terminating number has been ported from one local carrier to another local carrier.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

In accordance with principles of the present invention, set forth is a multi-media services provider system 10a, as will be described in detail below in connection with FIGS. 1 and 2. The multi-media services provider system 10a is adapted to provide a plurality of multi-media services including Software Defined Network (SDN), AT&T Digital Link (ADL) and Toll-Free services, as will also be described in detail below in connection with FIGS. 1 and 2.

Figure 1:
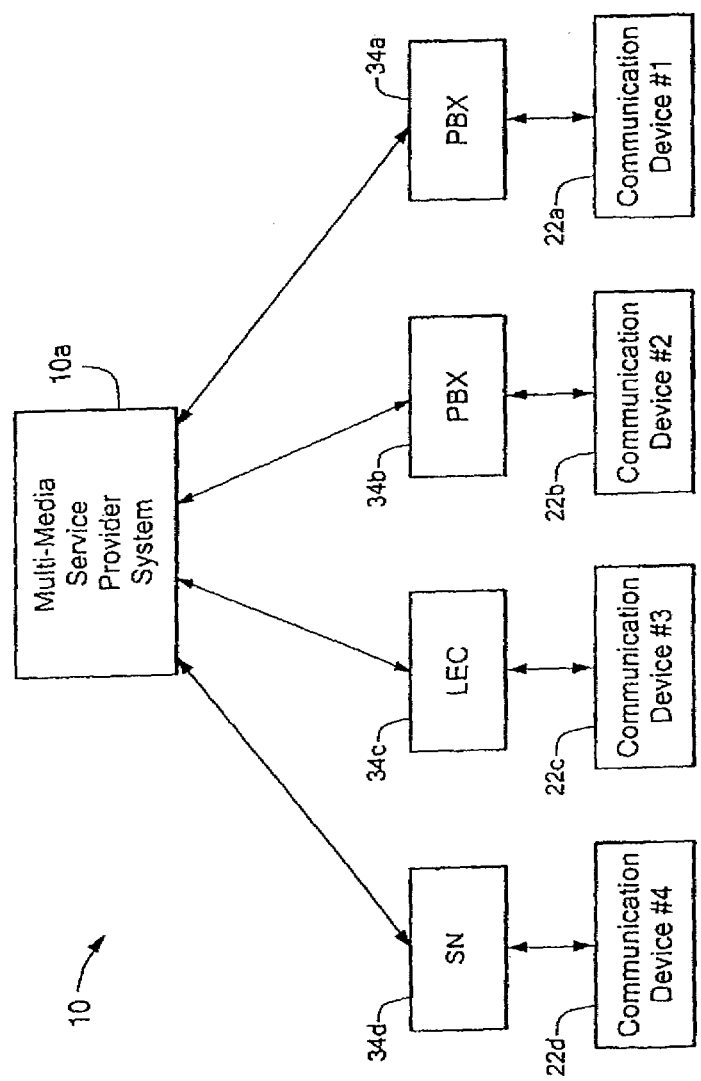
FIG. 1 is an exemplary high-level schematic block diagram of a system for providing multi-media communications between a plurality of communication devices according to the present invention.

Referring now to FIG. 1, shown is one embodiment of a communication network 10 for providing multi-media communications between at least a first 22a communication device and at least one of a plurality of other communication devices, such as second, third or fourth communication devices 22b, 22c, 22d in accordance with the present invention. The communication network 10 includes the multi-media provider system 10a, which is operative to provide a plurality of multi-media services to the first, second, third and fourth communication devices 22a, 22b, 22c, 22d, via respective first SIP-enabled IP-Private Branch Exchanges (PBX) 34a, second PBX 34b, Local Exchange carrier 34c and Switching Network (SN) 34d (e.g., circuit-based switching network provided by AT&T). It should be understood that the multi-media services provider system 10a is additionally operative to provide a plurality of multi-media services to a plurality of other communication devices not specifically shown herein.

Figure 2:
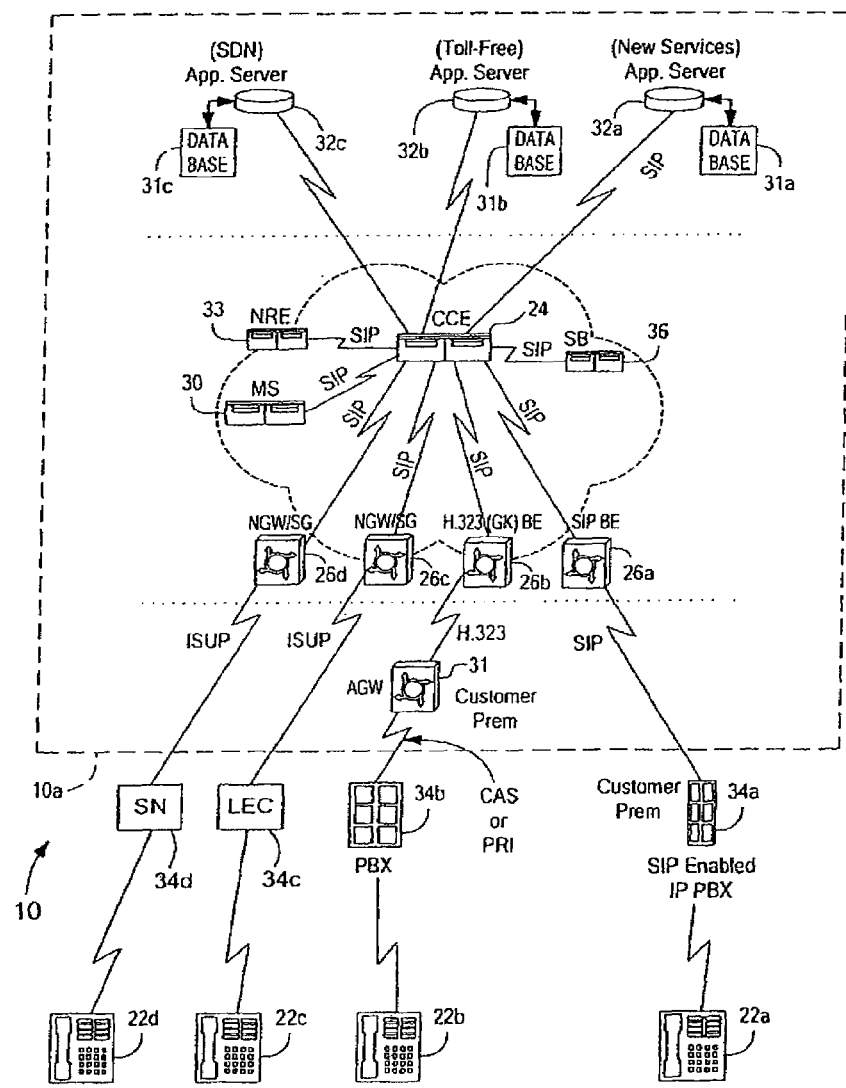
FIG. 2 is one exemplary embodiment of an expanded schematic block diagram of the system shown in FIG. 1.

Referring to FIG. 2, in the exemplary embodiment, the multi-media services provider system 10a includes a centrally located Call Control Element 24 (CCE), which is coupled to a Media Server (MS) 30, a plurality of Application Servers (ASs) 32a, 32b, 32c (collectively referred to hereinafter as ASs 32a-32c), at least one Network Routing Engine (NRE) 33, at least one Service Broker (SB) 36 and a plurality of Border Elements (BEs) 26a, 26b, 26c, 26d (collectively referred to hereinafter as BEs 26a-26d). It should be understood that the SB 36 and NRE 33 may be implemented within in a single CCE 24.

In the exemplary embodiment, the first BE 26a is coupled to the first communication device 22a, via the first PBX 34a and is adapted to operate using Session Initiation Protocol (SIP). The second BE 26b is coupled to the second communication device, via and access gateway 31 and the second PBX 34b and is adapted for operation using an H.323 protocol. Further, the third BE 26c is coupled to the third communication device 22c, via the LEC 34c and is adapted for operation using an ISDN User. Part Protocol (ISUP). The fourth BE 26d is coupled to the fourth communication device 22d, via the SN 34c and is also adapted for operation using ISUP. It should be understood that the BEs 26a-26d can be coupled to a plurality of other PBXs, LECs and/or SNs, which are included in other embodiments not specifically shown herein. Although not specifically shown, it should also be understood that one or more other communication systems and/or carriers (e.g., Sprint, MCI . . . etc. and the like) may be coupled intermediate to the LEC 34c and the third communication device 22c.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a-26d and upon receipt of the plurality of INVITE messages from the plurality of BEs 26a-26d, the CCE 24 can initiate an equal plurality of INVITE messages to the SB 36. The CCE 24 is further adapted to receive a plurality of Redirect messages from the SB 36 in response to the plurality of INVITE messages sent to the SB 36 from the CCE 24. When the CCE 24 receives a Redirect message back from the SB 36 in response to an INVITE message and depending on instructions provided by the SB 36 in the Redirect message, the CCE 24 can either send an INVITE message to one or more of the plurality of ASs 32a-32c for feature processing for the call or the CCE 24 can send an INVITE message to the NRE 33 (i.e. feature processing is not required for the call) to bypass the plurality of ASs 32a-32c and set up the call. The CCE 24 is further adapted to maintain the call state between the first 22a and the second 22b communication devices and to generate a call detail record (CDR) based on instructions received from any one or more of the plurality of ASs 32a-32c.

The CCE 24 is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third Party Call Control to create a call that connects two participants together or similarly, the CCE 24 can use Third Party Call Control to connect the MS 30 and the first communication device 22a. Generally, Third Party Call control allows the CCE 24 to connect the various end callers without having the media stream pass through the CCE 24 and yet, the CCE 24 can still maintain call state information.

In the exemplary embodiment, the plurality of BEs 26a-26d can be provided by Lucent Corporation of Murray Hill, N.J. In one embodiment, the plurality of BEs 26a-26d are adapted to use SIP as the signaling protocol for interfacing with the CCE 24. The first BEs 26a is adapted to use SIP as the signaling protocol for interfacing with the first 34a PBX. The second BE 26b is adapted to use H.323 as the signaling protocol for interfacing with the second PBX 34b, via the Access Gateway (AGW) 31. The third and fourth BEs 26c, 26d are respectively adapted to interface to the LEC 34c and the SN 34d using an ISUP protocol.

In the exemplary embodiment, the SB 36 can also be provided by Lucent Corporation of Murray Hill, N.J., Siemens of Alpharetta, Ga. or Alcatel of Plano, Tex. In one embodiment, the SB 36 acts as the SIP Redirect Server. The SB 36 operates to identify a particular service request, which is included in the INVITE message received at the SB 36 from the CCE 24. The SB further operates to instruct the CCE 24, via a Redirect message, to redirect the call to one or more of the plurality of ASs 32a-32c for service processing. In an embodiment, the SB 36 can identify a particular service requested by the call based on Calling Party Number, Originating IP Address, Dialed number Automatic Number Identification (ANI) information included in the INVITE message received at the SB 36 from the CCE 24. In addition, the SB 36 may perform call screening based on the Charge Party Station Type or Originating Line Information (OLI) received in the INVITE message at the SB 36.

After the SB 36 determines which of the first AS 32a, second AS 32b or third AS 32c as the primary and secondary processors for processing a particular call request, the SB 36 generates a Redirect message and populates the IP address/Port number combinations of the (primary/secondary) AS 32a, 32b or 32c in the Contact headers of the Redirect message, and sends it to the CCE 24. This approach permits the CCE 24 to query the secondary AS 32a, 32b or 32c in the event that the primary AS 32a, 32b or 32c is overloaded or not available to process the call request. If the SB 36 does not find a ANI or Dialed number match in the INVITE message received from the CCE 24, but has a carrier other than the multi-media service provider system 10a (e.g. AT&T), the SB 36 may send another Redirect message to the CCE 24 with the IP address of the NRE 33 indicating that the call request does not require AS 32a-32c processing, which effectively bypasses any service processing at the plurality of ASs 32a-32c. Although the SB 36 is depicted in FIG. 2 as a separate element, it should be understood that features provided by the SB 36 may be incorporated into the CCE 24.

In the exemplary embodiment, the plurality of ASs 32a-32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a-32c can be programmed with conventional Web-page interface software such as: "Visual Basic," "Java," "JavaScript," "HTML/DHTML," "C++," "J+," "Perl," or "Perlscript," and "ASP." The ASs 32a-32c can each further be programmed with an operating system, Web server software and Web Application software, such as an e-commerce application and computer network interface software.

In addition, the ASs 32a-32c contain the intelligence needed for offering multimedia services such as Toll-Free Calling or 800-Service, Virtual Private Networks, and various multimedia features like email, "Click-To-Dial." In an embodiment, the intelligence may include customer logic and data, as well as, common logic and data that may be used by all customers. It may be necessary for the CCE 24 to access the logic and data in the ASs 32a-32c in order to provide the multi-media services or features. The ASs 32a-32c may be a Back-to-Back User Agent (B2BUA) which is defined in the reference "SIP: Session Initiation Protocol" by Rosenberg, Schulzrinne, et. al., RFC 3261, June 2002. The ASs 32a-32c is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the ASs 32a-32c, permits the ASs 32a-32c to create a call in which communication is actually between other parties. For example, an operator can use Third Party Call Control to create a call that connects two participants together or similarly, the ASs 32a-32c can use Third Party Call Control to connect the MS 30 and the first communication device 22a. Generally, Third Party Call control allows the ASs 32a-32c to connect the various end callers without having the media stream pass through the ASs 32a-32c and yet, the ASs 32a-32c can still maintain call state information.

The ASs 32a-32c can each be further respectively coupled to databases 31a-31c, which each contain a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2. In the exemplary embodiment, the AS 32a is adapted to provide New Services, the AS 32b is adapted to provide Toll-Free services and the AS 32c is adapted to provide Software Defined Network (SDN) services.

The NRE 33 also operates as a SIP Redirect Server. The NRE 33 processes INVITE messages received from the CCE 24; performs address resolution based on the routing number returned from the AS 32a-32c and generates a Redirect message. The NRE 33 populates the Redirect message with the IP addresses of one or more destination BEs 26a-26d and sends the Redirect message to the CCE 24. In an embodiment, the NRE 33 can send the Redirect message to the CCE 24 with a predetermined hierarchical list of IP addresses corresponding to a predetermined hierarchical order of BEs 26a-26d for processing the call. In this arrangement, a highest level BE 26a, 26b, 26c or 26d defined on the list can receive and process the call and if the highest level BE 26a, 26b, 26c or 26d is unable to process the call or has insufficient resources to do so, the call may be redirected by the CCE 24 to a next successive BE 26a, 26b, 26c or 26d defined on the hierarchical list. Although the NRE 33 is depicted in FIG. 2 as a separate element, it should be understood that features provided by the NRE 33 may be incorporated into the CCE 24. The NRE 33 may also provide the LNP operation either by directly performing the function within the NRE platform or by querying an external LNP server (e.g., LNP is a capability that the government requires Telecommunication Service Providers to provide to allow telecommunication customers to 'keep' their telephone number even if they change from one telecommunication service provided to another).

The first, second, third and fourth communication devices 22a, 22b, 22c, 22d (collectively referred to as communication devices 22a-22d) can include a plurality of SIP-enabled devices and/or circuit-based devices, such as telephones, personal computers and PBXs. In addition, the communication devices 22a-22d can include a plurality of SIP-enabled and/or circuit-based wireless devices, such as cellular telephones, pagers and personal digital assistants ("PDAs").

The MS 30 of the exemplary embodiment, is constructed and arranged to provide a plurality of predetermined announcements to the communication devices 22a-22d and to collect information from the communication devices 22a-22d (e.g. caller-entered data). For example, if the caller is required to enter digits or a phrase for a Call Prompter service or SDN (Software Defined Network) service, the MS 30 will play the announcement prompting the caller to enter the required information. The MS 30 also collects the information entered by the caller. The MS 30 plays the announcements to the caller based on the instructions and announcement ID provided in the second INVITE message. In one embodiment, the announcements can include "Service Terminating" announcements or announcements for the caller to enter an authorization code, account code, or "call-prompter" digits.

In an exemplary embodiment, the MS 30 can be defined as a VoiceXML based MS 30. The MS 30 provides various announcements and collects various information from callers operating from the communication devices 22a-22d when features requiring caller interaction are required to complete a call. For example, if the caller must enter digits or a phrase for a Call Prompter service or SDN service, which can be provided by the multi-media services provider system 10a, the MS 30 will play the announcement prompting the caller to enter the required information. The MS 30 further collects the information entered by the caller, which is defined herein as "caller-entered data."

As described above, the CCE 24 is adapted to receive a call request or INVITE message from the communication devices 22a-22d, which requests multi-media services. In response, the CCE 24 can communicate with any one or more of the SB 36, the plurality of application servers 32a-32c, the NRE 33 and/or the plurality of BEs 26a-26d using a number of predetermined INVITE messages.

In an embodiment, after processing the above-described INVITE message at one or more of the plurality of application servers 32a-32c, the one or more of the plurality of application servers 32a-32c can generate and send an INVITE or Redirect message to the CCE 24, which instructs the CCE 24 to set up the call request, as described above.

An exemplary call flow for providing local and toll services with LNP and toll-free services to a calling party, which call originates from an IP location connected to a sip-enabled IP network, includes initiating a call from the first communication device 22a by dialing a number for the destination address. The destination number can be a local call, toll call, or a toll free call, which for example, may be associated with one of the second, third or fourth communication devices 22b, 22c, 22d. Further, the destination number is provided to the ingress or first BE 26a in a first INVITE message. The ingress BE 26a forwards the first INVITE message to the CCE.

Upon receipt of the first INVITE message, the CCE appends a message body to the first INVITE message with appropriate parameters, such as the Charge Number, Local Calling Party Address (LCPA), Local Access and Transport Area (LATA), Charge Party Station Type (a.k.a. OLI) and Carrier information (e.g., information related to AT&T, MCI or Sprint), as well as other various information signaled in from the calling or first communication device 22a. Thereafter, the CCE forwards the first INVITE message to the SB 36 and waits for the SB 36 to respond with a first Redirect message.

The SB 36 receives and processes the first INVITE message by using the information in the first INVITE message (e.g., Charge Number, Collected Address, Carrier) to identify service matches, and the corresponding primary and secondary IP address/port number combination of the AS 32a-32c (e.g., 8YY-AS or SDN-AS), which supports the service. Accordingly, the SB 36 sends the first Redirect message to the CCE, which includes the IP address/port number combinations of the primary AS 32a-32c for providing the service.

Based on the received IP address/port number of the primary AS 32a-32c provided by the SB 36, the CCE 24 generates and sends a second INVITE message to the AS 32a-32c. The second INVITE message includes a plurality of information, such as the Charge Number and Collected Address, among other parameters. If the call originates from a subscriber to local service, the second INVITE message may further include LCPA, LATA and Carrier information.

In an embodiment, if the call is an SDN call, the CCE 24 sends the second INVITE message representing the call request to the AS 32c, which is constructed and arranged for handling SDN service for the incoming call request. The AS 32c receives the second INVITE message and accesses the customer's account. The customer account applies appropriate screening and feature processing for the call. If the call request is from a subscriber to local services, the second INVITE message may contain a Local Calling Party Address (LCPA) parameter which is associated with the originating trunk group.

In order to determine the jurisdiction of the call, the AS 32c uses the LCPA, which indicates the geographic location of the calling party, along with the Collected Address, which indicates the geographic location of the destination or called party. The Local Toll Differentiation algorithm located in the AS 32a provides a jurisdiction of either local, intra-lata toll, or inter-lata toll. With the jurisdiction of the call determined, the AS 32c uses the jurisdiction to set the recording information and routing information to indicate how the call should be recorded and routed. Further, the AS 32c uses the Recording Information and Instructions (R) parameter to pass this recording information to the CCE 24. The AS 32c uses a combination of the Carrier, Carrier Usage, and Primary Routing Address (PRA) to convey to the CCE 24 how to route the call. The Primary Routing Address may be a routing number translated from the original Toll-Free number; and if the routing number contains a NPA-NXX open to portability, then the NRE will perform Local Number Portability processing. The AS 32c also processes any other SDN features (Authorization Codes, Account Codes, etc.) determined by the customer account. It should be understood that the routing and recording information described above may be passed using a Redirect (or INVITE).

Upon receipt of the second Redirect (or INVITE) message from the AS 32c, the CCE 24 consults the SB 36 to determine if any other features need to be applied to the call. If the SB 36 determines that other features are required, the CCE queries the appropriate AS 32a-32c. If no other features are required, the CCE 24 generates and sends a third INVITE message to the NRE 33 for address resolution and waits for a third Redirect message from the NRE 33 including the address resolution information. The CCE 24 also creates a Call Detail Record using the information received in the R parameter received in the second Redirect message sent from the AS 32c.

Upon receipt of the third INVITE message from the CCE 24, the NRE 33 performs predetermined address resolution functions. In an embodiment, the predetermined address resolution functions includes determining whether the Primary Routing Address (PRA) has been ported, and if so, the predetermined address resolution functions further includes determining the ported number. In one embodiment, if the number is ported, the ported number will be returned in the PRA parameter and the original PRA will be returned in the Original Primary Address (OPA); the OPA indicates that the number has been ported. The NRE 33 performs the address resolution based on the ported number and sends the resulting third Redirect message back to the CCE 24, which includes the IP addresses of multiple BEs 26a-26d in an ordered list.

Based on the information provided by the NRE 33 to the CCE 24 in the third Redirect message, the CCE 24 generates and send a fourth INVITE message which is sent to the primary BE 26a, 26b, 26c or 26d defined on the ordered list for completing the call. If the NRE 33 has performed the LNP processing, the CCE 24 forwards both the PRA and Original Primary Address (OPA) to the primary BE 26a, 26b, 26c or 26d defined on the ordered list. In the event that the primary BE 26a, 26b, 26c or 26d defined on the ordered list does not have enough resources to process the call request, the CCE 24 will attempt to send the call request to the next successive BE 26a, 26b, 26c or 26d defined on the ordered list. Upon receipt of the fourth INVITE message from the CCE 24, the primary or next successive BE 26a, 26b, 26c or 26d defined on the ordered list attempts to complete the call based on the PRA and the other information in the call request.

In another embodiment, lithe call is a toll free call, the CCE 24 sends the second INVITE message (i.e., call request) to the AS 32b as opposed to the AS 32c, as described above, which is constructed and arranged for handling Toll-Free service for the incoming call request. In the second INVITE message sent to the AS 32b, the CCE 24 sets a Backhaul Indicator parameter to NULL. In the exemplary embodiment, the NULL parameter of the Backhaul indicator provides a notice or a flag representing that the AS 32b needs to perform certain functions, such as check the Backhaul Screening Table, associated with Toll-Free calls. The Backhaul Indicator parameter may also serve as a multi-media service identifier. For example, the Backhaul Indicator parameter can be set to a first predetermined state representing that AS 32b includes resources for processing a call request. Similarly, the Backhaul Indicator parameter can be set to a second predetermined state representing that AS 32b does not include resources for processing the call request and that the call request should be redirected to another carrier for processing the call request.

The AS 32b receives and processes the second INVITE for the Toll-Free call request. If the call request is from a subscriber to local services, the second INVITE message may contain the Backhaul Indicator parameter associated with the originating trunk group. Based on the presence of a BI parameter, the AS 32b will access a Backhaul Screening Table to determine if this call can be handled by the multi-media provider system 10a. In an embodiment, the multi-media provider system 10a includes systems and services provided by AT&T. In another embodiment, the AS 32b may compare a Toll-Free number included in the second INVITE message to another Toll-Free number which is associated with the AS 32b. If the AS 32 determines that the Toll-Free number included in the second INVITE message matches the Toll-Free number associated with the AS 32b, the AS 32b may handle the call request. However, if the AS 32 determines that the Toll-Free number included in the second INVITE message does not match the Toll-Free number associated with the AS 32b, the AS 32b may not handle the call request.

If the call can be handled by the multi-media provider system 10a, which in the exemplary embodiment includes systems and services provided by AT&T, the AS 32b accesses the customer logic to provide the necessary Toll-Free features. The AS 32b generates and sends a second Redirect (or INVITE) message containing the routing information and recording information to the CCE 24. The AS 32b, however, does not return the BI parameter in the second Redirect message provided to the CCE because Toll-Free processing has already been executed for the call request by the AS 32b.

The AS 32b uses the Recording Information and Instructions (R) parameter defined in the second Redirect (or INVITE) message to pass the recording information to the CCE 24. Upon receipt of the response from the AS 32b, the CCE 24 queries the SB 36 to determine if the call requires further feature processing. The call completes by routing to the terminating location indicated by the Primary Routing Address (PRA).

If the call cannot be handled by the multi-media provider system 10a (e.g., AT&T), the AS 32b sets the BI to 'backhaul' in the second Redirect (or INVITE) message, which is sent to the CCE 24. A BI parameter set to 'backhaul' identifies that the call needs to be sent to the LEC 34C for determination of the Toll-Free carrier. Further, the LEC 34C should dip the Industry Toll-Free Database (not shown) to determine the carrier and pass the call to the carrier for appropriate processing.

Upon receipt of the second Redirect (or INVITE) message from the AS 32b, the CCE 24 consults the SB 36 to determine if any other features need to be applied to the call. If the SB 36 determines that other features are required, the CCE queries the appropriate AS 32a-32c. If no other features are required, the CCE 24 generates and sends a third INVITE message to the NRE 33 for address resolution and waits for a response from the NRE 33 in the form a third Redirect message. For the call of this exemplary embodiment, the CCE 24 receives the second Redirect message from the AS 32b with the BI set to 'backhaul', and the CCE 24 forwards the BI parameter in the third INVITE message, which as described above is sent to the NRE 33. The CCE 24 also creates a Call Detail Record using the information received in the R parameter, which is included in the second Redirect (or INVITE) message received at the CCE 24 from the AS 32b.

Upon receipt of the third INVITE message at the NRE 33 from the CCE 24, the NRE 33 performs the address resolution functions. The NRE 33 performs the address resolution functions based on the PRA and sends the resulting IP addresses of multiple BEs 26a-26d in an ordered list back to the CCE 24 in the third Redirect message. If the third INVITE message sent received at the NRE 33 contains the BI parameter set to 'backhaul', the NRE 33 will send this information (e.g., the ordered list of BEs 26a-26d for processing the call) in the third Redirect message to the CCE 24.

When the NRE 33 receives the BI parameter set to 'backhaul', the NRE 33 finds a route to backhaul the call to the Network Gateway Border Element, which in the exemplary embodiment is BE 26d, and which contains the route list of trunks to the LEC 34c for querying the Industry Toll Free Database (ITFDB). In addition, based on the information included in the third Redirect message received from the NRE 33, the CCE 24 generates and sends a fourth INVITE message to the primary BE 26d defined on the ordered list of BEs 26a-26d for processing and/or completing the call. In the event that the primary BE 26d defined on the ordered list of BEs 26a-26d does not have enough resources to process the call request, the CCE 24 will attempt to send the call request to the next successive BE 26a-26c defined on the ordered list. Thereafter, the appropriate BE, e.g., BE 26d, receives and processes the fourth INVITE message from the CCE 24 and attempts to complete the call based on the PRA and the other information included in the fourth INVITE message associated with the call request.

In another embodiment, the first communication device 22a may originate a call request to the multi-media provider system 10a, via a first INVITE message, which includes Alternate Routing features. More specifically, the calling party operating the first communication device 22a, for example, may initiate a call request by dialing the number for the destination address. The destination number may be a local call, toll call, or a Toll-Free call. The ingress BE 26a receives and forwards the first INVITE message, which represents the call request, to the CCE 24.

Upon receipt of the first INVITE message representing the call request, the CCE 24 appends a message body to the first INVITE message with appropriate parameters, such as the Charge Number, Local Calling Party Address (LCPA), LATA, Charge Party Station Type (a.k.a. OLI) and Carrier among other things and also other information that was signaled in from the originating device (e.g. first communication device 22a), and forward the first INVITE message to the SB 36 for processing. The CCE 24 then waits for the SB 36 to provide a first Redirect message in response to receipt of the first INVITE message.

The SB uses the information contained in the first INVITE message (e.g., Charge Number, Collected Address, Carrier) to identify service matches, and the corresponding primary and secondary IP address/port number combination of the AS 32a, 32b or 32c (e.g., 8YY-AS or SDN-AS) that supports the service and can process the call. The SB sends the IP address/port number combinations of the application and AS 32a, 32b or 32c that supports the service in the first Redirect message to the CCE 24.

Based on the received IP address/port number of the AS 32a, 32b or 32c that supports the requested service received in the first Redirect message at the CCE 24 from the SB 36, the CCE 24 generates and sends a second INVITE to the AS 32a, 32b or 32c that supports the requested service. The second INVITE message may include information such as the Charge Number and Collected Address among other parameters. If the call originates from a subscriber to local service, the second INVITE message will also include LCPA, LATA, Carrier, and if the call is a Toll-Free Call, the second INVITE message will also include a Backhaul Indicator.

The CCE 24 sends the call request to the AS 32a, 32b or 32c handling the service (e.g. SDN, Toll-Free or New Service) for the incoming call request. The AS 32a, 32b or 32c receives the second INVITE message and accesses the customer's account. The customer account applies appropriate screening and feature processing for the call.

In the exemplary call request, it is assumed that the customer subscribes to an alternate routing feature for this destination address (e.g. SDN Off-net Overflow on Egress Busy or Alternate Destination Routing (ADR) for Toll-Free). The AS 32a, 32b or 32c populates the Primary Routing Address (PRA), Alternate Routing Address (ARA), and the Alternate Routing Conditions (ARC) in a second Redirect message, which is sent to the CCE 24. The AS 32a, 32b or 32c uses the Recording Information and Instructions (R) parameter to pass this recording information to the CCE 24 for both the PRA and ARA. Upon receipt of the second Redirect (or INVITE) message at the CCE 24 from the AS 32a, 32b or 32c, the CCE 24 consults the SB 36 to determine if any other features need to be applied to the call. If the SB 36 determines that other features are required, the CCE queries the appropriate AS 32a-32c. If no other features are required, then the CCE 24 generates and sends a third INVITE message to the NRE 33 for address resolution and waits for a third Redirect message in response to the third INVITE message from the NRE 33. The CCE 24 further forwards the PRA, ARA, and ARC to the NRE 33. The CCE 24 also creates a Call Detail Record using the information received in the R parameter provided in the second Redirect (or INVITE) message from the AS 32a, 32b or 32c. After receiving the response from the AS 32b, the CCE 24 queries for a second time the SB 36 to determine whether or not the call requires further feature processing. If the call request does not require further feature processing, then the SB 36 informs the CCE 24 to proceed to routing by querying the NRE 33 by sending a third INVITE message to the NRE 33.

Upon receipt of the third INVITE message from the CCE 24, the NRE 33 performs and address resolution operation. The address resolution operation includes determining whether the PRA and ARA have been ported. If the numbers are ported, the ported numbers will be returned in the PRA and ARA parameters; the original PRA will be returned in the Original Primary Address (OPA); and the ARA will be returned in the Original Alternate Address (OAA). The OPA and the OAA indicate that the numbers have been ported. The NRE 33 performs the address resolution based on the ported numbers and sends the resulting IP addresses of multiple BEs 26a-26d in an ordered list, as well as the above-described signaling information and/or parameters, back to the CCE 24 in a third Redirect message.

Based on the information included in the third INVITE received from the NRE 33 and the presence of the ARC, the CCE 24 sets triggers for Alternate Routing conditions, the CCE 24 uses the PRA to forward the INVITE to the BE 26a-26d to attempt to complete the call over the Primary Route. If the NRE 33 has performed the LNP processing, the CCE 24 forwards the PRA, OPA and ARA, OAA in a fourth INVITE message to the appropriate BE 26a-26d.

In the exemplary embodiment, the fourth INVITE message is forwarded to BE 26d (e.g., Network Gateway BE), which is defined as the primary BE 26d for processing the call request. In the event that the primary BE 26d defined on the list does not have enough resources to process the fourth INVITE message representing the call request, the CCE 24 will attempt to send the fourth INVITE message to the next successive BE 26a-26c defined on the list.

Upon receipt of the fourth INVITE message at the BE 26d, the BE 26d attempts to complete the call based on the PRA and the other information included in the fourth INVITE message for processing the call request. If the BE 26d returns a cause code indicating that the call cannot be completed due to given condition (e.g. ring no answer or busy), the CCE 24 checks the Alternate Routing Conditions to invoke Alternate Routing Address and attempts to route the call request using the Alternate Routing Address. If present the CCE 24 includes the OAA in the fourth INVITE message sent to the BE 26d, the CCE 24 updates the CDRs with the recording information for the ARA.

Figure 3:
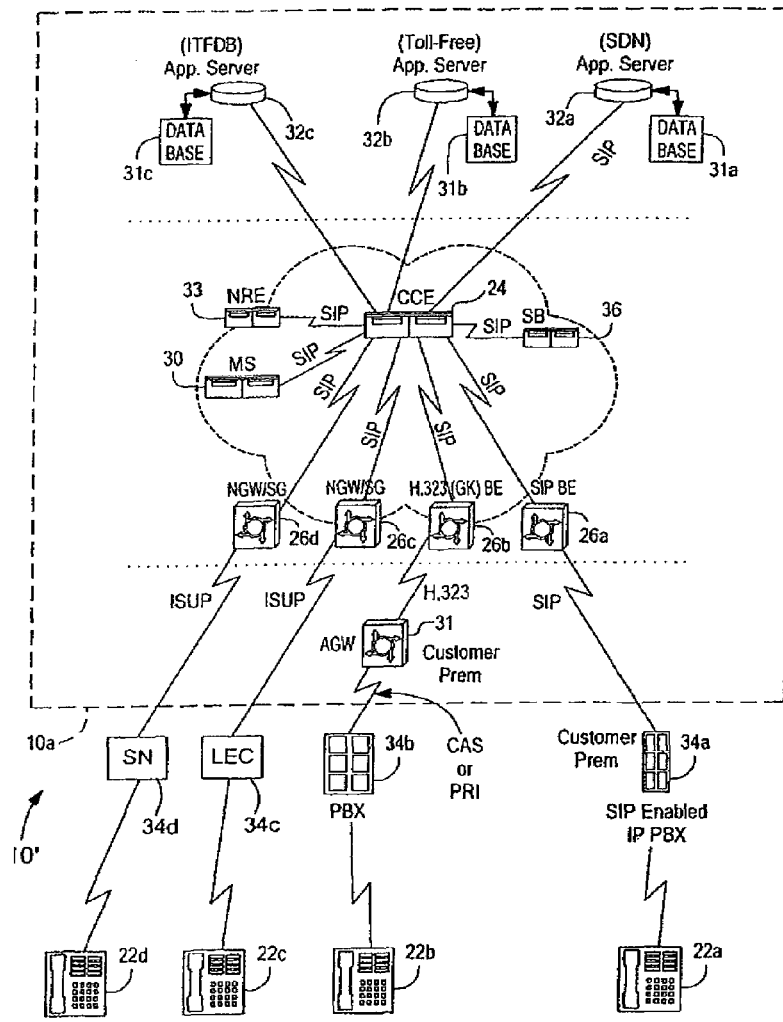
FIG. 3 is another exemplary embodiment of an expanded schematic block diagram of the system shown in FIG. 1.

Referring to FIG. 3, shown is a communication network 10', which is similar to the communication network 10, as described above with respect to FIG. 2, where similar elements are provided with similar reference designations. In the communication system 10' of FIG. 3, however, the AS 32a is adapted to provide SDN services, the AS 32b is adapted to provide Toll-Free services and the AS 32c is adapted to provide Industry Toll-Free Database (ITFDB) services. It should be understood that the AS 32c may be located on the communication network 10', as shown in FIG. 3 or in other embodiments not shown herein, the AS 32c may be located remotely (i.e., remote AS 32b) on other communication networks (not shown).

In the exemplary embodiment, the CCE 24 is adapted for querying the ITFDB to determine the Carrier for a Toll-Free call request. More particularly, calling party operating at the first communication device 22a, for example, initiates a call (e.g., first INVITE message) by dialing the number for the destination address. The destination number can be a local call, toll call, or a toll free call. The ingress BE, which is BE 26a in the exemplary embodiment, forwards the first INVITE message to the CCE 24. Upon receipt of the first INVITE message, the CCE 24 queries the SB to check whether the call is a Toll-Free call.

In an embodiment, if the SB informs the CCE that call is a Toll-Free call, then the CCE 24 queries the Industry Toll-Free Database (ITFDB) associated with AS 32c via a signaling gateway, with appropriate parameters like LATA, Charge number, and Collected Address among other things using SS7 signaling or SIP signaling. Upon receipt of the response from the ITFDB via a first redirect message, the CCE 24 sends the information received from the ITFDB in a query to the SB 36 to determine what feature processing applies. If the SB 36 determines that the Toll-Free carrier is not associated with the multi-media provider system 10a" (e.g., first carrier), which is the exemplary embodiment includes systems and services provided by AT&T, the SB 33 informs the CCE 24, which then generates and sends a second INVITE message to the NRE 33 with other carrier information returned along with LATA among other things.

The CCE 24 also creates a Call Detail Record. Upon receipt of the second INVITE message from the CCE 24, the NRE 33 performs the address resolution functions. The NRE 33 performs the address resolution based on the Carrier returned from the ITFDB and sends the resulting IP addresses of multiple BEs 26a-26d in an ordered list back to the CCE 24. Based on the information provided in a second Redirect message received from the NRE 33, the CCE 24 generates and sends a third INVITE message to the BE 26a-26d to complete the call. In the event that the first BE 26a-26d in the list does not have enough resources to process the call request, the CCE 24 will attempt to send the call request to the next BE 26a-26d in the list. Upon receipt of the third INVITE message from the CCE 24, the BE 26a-26d attempts to route the call to the Carrier of the Toll-Free number. It should be understood that there may be multiple other carriers for which the call request could be routed including, but not limited to, Sprint and MCI.

In another embodiment, if the CCE 24 determines the Toll-Free carrier is associated with the multi-media provider system 10a", which in the exemplary embodiment includes systems and services provided by AT&T, the CCE 24 includes in the first INVITE appropriate parameters such as the Charge Number, Local Calling Party Address (LCPA), LATA, Charge Party Station Type (a.k.a. OLI) and Carrier and also other information that was signaled in from the originating device. The CCE 24 forwards the first INVITE message to the SB 36.

The CCE 24 then waits for a first Redirect message from the SB 36 responsive to the first INVITE message. At the SB 36, the SB 36 processes the first INVITE message using the information included in the first INVITE message (e.g., Charge Number, Collected Address, Carrier) to identify service matches, and the corresponding primary and secondary IP address/port number combination of the AS 32a-32e (e.g., Basic or Advanced 8YY AS) that supports the service. The SB 36 sends the IP address/port number combinations of the application and AS 32a-32c in the first Redirect message sent to the CCE 24. Based on the received IP address/port number of the primary AS 32a-32c, which in the exemplary embodiment is AS 32b, the CCE 24 generates and sends a second INVITE message to the AS 32b. The second INVITE message includes information such as the Charge Number and Collected Address among other parameters. Since this call is a Toll-Free call, it originates from a subscriber to local service, and therefore, the second INVITE message also includes LCPA, LATA, and Carrier. The AS 32b receives the second INVITE message and accesses the customer's account. The customer account applies appropriate screening and necessary Toll-Free feature processing for the call.

The AS 32b creates a second Redirect (or INVITE) message containing the routing information and recording information and sends the second Redirect (or INVITE) message to the CCE 24. The AS 32b uses the Recording Information and Instructions (R) parameter to pass the recording information to the CCE 24. The AS 32b uses a combination of the Carrier, Carrier Usage, and Primary Routing Address (PRA) to convey to the CCE 24 how to route the call.

Upon receipt of the second Redirect (or INVITE) message from the AS 32b, the CCE 24 consults the SB 36 to determine if any other features need to be applied to the call. If the SB 36 determines that other features are required, the CCE queries the appropriate AS 32a-32c. If no other features are required, the CCE 24 generates and sends a third INVITE to the NRE 33 for address resolution and waits for a third Redirect response from the NRE 33. The CCE 24 also creates a Call Detail Record using the information received in the R parameter from the AS 32b. Upon receipt of the third INVITE message from the CCE 24, the NRE 33 performs the address resolution functions. This includes determining whether the PRA has been port, and if so the ported number. If the number is port, the ported number will be returned in the PRA parameter and the original PRA will be returned in the Original Primary Address (OPA); the OPA indicates that the number has been ported. The NRE 33 performs the address resolution based on the ported number and sends the resulting IP addresses of multiple BEs 26a-26d in an ordered list back to the CCE, via the third Redirect (or INVITE) message. Based on the information in the third Redirect (or INVITE) message received from the NRE 33, the CCE 24 generates and sends a fourth INVITE message including attributes of the third Redirect (or INVITE) message to the BE 26a-26d to complete the call. If the NRE 33 has performed the LNP processing, the CCE 24 forwards both the PRA and OPA to the BE 26a-26d. In the event that the first BE, e.g., BE 26d, does not have enough resources to process the call request, the CCE 24 will attempt to send the call request to the next. BE 26a-26c in the list. Upon receipt of the fourth INVITE message from the CCE 24, the BE 26d attempts to complete the call based on the PRA and the other information in the call request.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

The invention claimed is:

1. A method of forming a multi-media communication path between a first communication device and a second communication device, comprising:
  receiving, by a call control element of a multi-media provider, a first invite message representing a first call request for a first multi-media service;
  redirecting, by the call control element, the first invite message to a service broker associated with the multi-media provider for processing the first invite message for determining a first application server associated with the multi-media provider which includes first resources for processing the first invite message;
  receiving, by the call control element, a first redirect message from the service broker responsive to the first invite message; and
  processing, by the call control element, the first redirect message to generate a second invite message and including a multi-media service identifier, wherein the second invite message allows the first application server to determine whether the first application server includes resources for satisfying the first call request, and to allow a setting of the multi-media service identifier to a first state when it is determined that the first application server includes the resources for satisfying the first call request and a setting of the multi-media service identifier to a second state when it is determined that the first application server does not include the resources for satisfying the first call request.

2. The method of claim 1, wherein when the multi-media service identifier is set to the first state representing that the first application server includes resources for satisfying the first call request, the method further includes:
processing the second invite message at the first application server using the first resources to satisfy the first call request;
receiving a second redirect message at the call control element from the first application server responsive to the second invite message and including the multi-media service identifier set to the first state;
detecting the first state of the multi-media service identifier at the call control element;
querying the service broker to determine whether the first call request requires further processing using other resources associated with another application server; and
processing the first call request at the another application server when the service broker determines that the first call request requires further processing.

3. The method of claim 2, further including:
repeating querying the service broker until it is determined that the first call request no longer requires further processing using other resources associated with the another application server.

4. The method of claim 3, further including:
generating a third invite message at the call control element responsive to a communication by the service broker representing that the first call request no longer requires processing;
receiving and processing the third invite message at a network routing element associated with the multi-media provider to determine an address associated with a border element located on the multi-media provider for which the second communication device is coupled; and
receiving a third redirect message at the call control element from the network routing element responsive to the third invite message and including the address associated with the border element; and
generating and sending a fourth invite message to the border element for forming the multi-media communication path between the first communication device and the second communication device.

5. The method of claim 1, wherein setting the multi-media service identifier to the first state includes setting a backhaul indicator to null.

6. The method of claim 1, wherein setting the multi-media service identifier to the first state includes setting the multi-media service identifier to a geographic location parameter representing a location of a calling party operating at the first communication device.

7. The method of claim 6, wherein the geographic location parameter is determined from a charge number associated with the calling party operating at the first communication device.

8. The method of claim 6, wherein the geographic location parameter is determined from a network database based on a charge number.

9. The method of claim 1, wherein processing the second invite message at the first application server includes classifying the second invite message based on a distinction between toll calls and local calls.

10. The method of claim 1, wherein processing the second invite message at the first application server includes classifying the second invite message based on a distinction between local calls, intraLATA toll calls, and interLATA toll calls.

11. The method of claim 1, wherein setting the multi-media service identifier to the second state includes setting a backhaul indicator to backhaul.

12. The method of claim 1, wherein the determining whether the first application server includes the resources for satisfying the first call request includes comparing a first toll-free number associated with the second invite message to a second toll-free number associated with the first application server.

13. The method of claim 1, wherein when the multi-media service identifier is set to the second state representing that the first application server does not include resources for satisfying the first call request, the method further includes:
receiving a second redirect message at the call control element from the first application server responsive to the second invite message and including the multi-media service identifier set to the second state;
detecting the second state of the multi-media service identifier at the call control element; and
generating a third invite message at the call control element responsive to detecting the second state of the multi-media service identifier.

14. The method of claim 13, further including:
receiving and processing the third invite message at a network routing element associated with the multi-media provider to determine an address associated with a border element located on the multi-media provider for which a local exchange carrier is coupled, wherein the processing includes determining porting information which relates to whether or not the primary routing number has been ported from one local carrier to another local carrier and communicating the porting information in the third redirect message communicated to the call control element;
receiving a third redirect message at the call control element from the network routing element responsive to the third invite message and including the address associated with the border element for which a local exchange carrier is coupled;
generating a fourth invite message at the call control element and including the address associated with the border element for which a local exchange carrier is coupled; and
sending the fourth invite message to the border element for forming a multi-media communication path between the first communication device and the second communication device, via the local exchange carrier.

15. A method of forming a multi-media communication path between a first communication device and a second communication device, comprising:
receiving, by a call control element of a first carrier, a first invite message representing a first call request for a first multi-media service;
redirecting, by the call control element, the first invite message to a service broker associated with the first carrier for processing the first invite message for determining an address of a remote application server associated with an industry toll-free database;
receiving, by the call control element, a first redirect message from the service broker responsive to the first invite message and including the address of the remote application server; and processing, by the call control element, the first redirect message to generate a second invite message and including the address of the remote application server, wherein the second invite message allows the remote application server to determine an identifier associated with a carrier which includes resources for satisfying the first call request.

16. The method of claim 15, further including:
receiving a second redirect message at the call control element from the remote application server responsive to the second invite message and including the identifier of the carrier which includes resources for satisfying the first call request.

17. The method of claim 16, further including:
generating a third invite message at the call control element and including the identifier of the carrier which includes resources for satisfying the first call request; and
receiving and processing the third invite message at the service broker to determine whether the identifier of the carrier is associated with a multi-media provider.

18. The method of claim 17, wherein when service broker determines that the identifier of the carrier is associated with the multi-media provider, the method further includes:
receiving a third redirect message at the call control element form the service broker responsive to the third invite message; and
processing the third redirect message at the call control element to generate a fourth invite message and including and address associated with a first application server associated with the multi-media provider which includes resources for processing the first call request.

19. The method of claim 17, further including:
receiving and processing the fourth invite message at the first application server using resources of the first application server to satisfy the first call request;
generating a fourth redirect message at the first application server;
receiving and processing the fourth redirect message at the call control element from the first application server responsive to the fourth invite message;
querying the service broker to determine whether the first call request requires further processing using other resources associated with another application server associated with the multi-media provider; and
processing the first call request at the another application server when the service broker determines that the first call request requires further processing.

20. The method of claim 19, further including:
repeating querying the service broker until the first call request is determined to no longer require further processing using other resources associated with the another application server.

* * * * *